(12) United States Patent
Wenger et al.

(10) Patent No.: US 10,555,547 B2
(45) Date of Patent: Feb. 11, 2020

(54) MEAT DEWATERING ASSEMBLY

(71) Applicant: Wenger Manufacturing Inc., Sabetha, KS (US)

(72) Inventors: LaVon Wenger, Sabetha, KS (US); Allan C. Spellmeier, Fairview, KS (US)

(73) Assignee: Wenger Manufacturing Inc., Sabetha, KS (US)

( * ) Notice: Subject to any disclaimer, the term of this patent is extended or adjusted under 35 U.S.C. 154(b) by 75 days.

(21) Appl. No.: 15/840,926

(22) Filed: Dec. 13, 2017

(65) Prior Publication Data

US 2018/0228183 A1 Aug. 16, 2018

Related U.S. Application Data

(60) Provisional application No. 62/459,689, filed on Feb. 16, 2017.

(51) Int. Cl.
*A23K 30/20* (2016.01)
*A22C 7/00* (2006.01)

(52) U.S. Cl.
CPC ............ *A23K 30/20* (2016.05); *A22C 7/0023* (2013.01)

(58) Field of Classification Search
CPC ...................................................... A23K 30/20
USPC .................................... 100/117; 366/83, 292
See application file for complete search history.

(56) References Cited

U.S. PATENT DOCUMENTS

| 617,735 | A | * | 1/1899 | Godfrey | A21C 3/04 366/76.5 |
| 2,567,219 | A | | 9/1951 | Lesniak | |
| 3,021,782 | A | * | 2/1962 | Ginaven | B30B 9/16 100/146 |
| 3,325,864 | A | * | 6/1967 | Shinichi | B29C 48/252 366/83 |
| 3,461,793 | A | * | 8/1969 | Solberg | B30B 9/16 100/117 |

(Continued)

FOREIGN PATENT DOCUMENTS

| CN | 101103825 A | 1/2008 |
| CN | 101531054 A | 9/2009 |

(Continued)

OTHER PUBLICATIONS

Baldwin. "Adding flexibility to the extrusion process." Animal Feed, 2007.

(Continued)

*Primary Examiner* — David L Sorkin
(74) *Attorney, Agent, or Firm* — Hovey Williams LLP (57) ABSTRACT

A meat dewatering assembly (10) includes a support frame (12), a twin screw dewatering unit (14), a drive assembly (16) coupled with the unit (14), and a perforated housing (60). The unit (14) has a pair of tapered, non-parallel, intermeshed, helically flighted screws (52, 54) presenting nip clearances (59) between the fighting (55). The drive assembly (16) serves to counter-rotate the screws (52, 54). In use, emulsified meat is passed into the housing (60) during counter-rotation of the screws (52, 54), in order to compress the meat within the clearances (59) and thereby express water from the meat. Adjustment collars (38) permit selective size alteration of the nip clearances (59).

14 Claims, 7 Drawing Sheets

(56) References Cited

U.S. PATENT DOCUMENTS

| | | | |
|---|---|---|---|
| 4,408,888 A * | 10/1983 | Hanslik | B29C 48/395 366/83 |
| 4,438,691 A | 3/1984 | Solberg | |
| 4,457,227 A | 7/1984 | Koch | |
| 4,565,124 A | 1/1986 | Stautland et al. | |
| 4,818,206 A * | 4/1989 | Maillefer | B29C 48/40 425/204 |
| 4,935,183 A | 6/1990 | Wenger et al. | |
| 5,232,280 A | 8/1993 | Moriyama | |
| 5,333,556 A | 8/1994 | Isobe et al. | |
| 5,357,855 A * | 10/1994 | Ishigaki | B30B 9/12 100/48 |
| 5,417,155 A | 5/1995 | Tatsuzawa et al. | |
| 5,628,560 A | 5/1997 | Eigruber | |
| 5,694,833 A | 12/1997 | Wenger | |
| 5,743,178 A | 4/1998 | Babbini | |
| 6,234,661 B1 | 5/2001 | Thewes | |
| 6,550,376 B2 | 4/2003 | Johnston | |
| 6,609,819 B2 | 8/2003 | Hauck et al. | |
| 6,688,217 B2 | 2/2004 | Hauck et al. | |
| 6,805,480 B1 | 10/2004 | Behling | |
| 7,191,700 B2 | 3/2007 | Sasaki | |
| 7,322,738 B2 | 1/2008 | Yamane et al. | |
| 7,632,006 B2 | 12/2009 | Schulz | |
| 7,731,879 B2 | 6/2010 | Winter et al. | |
| 8,079,747 B2 | 12/2011 | Ek et al. | |
| 8,596,856 B2 | 12/2013 | Chang | |
| 9,316,439 B2 | 4/2016 | Tucker | |
| 2005/0219943 A1 | 10/2005 | Yamane et al. | |
| 2008/0069916 A1 | 3/2008 | Regalia | |
| 2013/0264264 A1 | 10/2013 | Lehoux et al. | |

FOREIGN PATENT DOCUMENTS

| | | |
|---|---|---|
| CN | 201439223 U | 4/2010 |
| CN | 102225317 A | 10/2011 |
| CN | 102275285 A | 12/2011 |
| CN | 202062635 U | 12/2011 |
| CN | 102490340 A | 6/2012 |
| DE | 10113949 A1 | 9/2002 |
| EP | 0358837 B2 | 7/2003 |
| WO | 2004080704 A1 | 9/2004 |

OTHER PUBLICATIONS

Amruthraj, Bharath. "Design of Twin Screw Oil Expeller for Pongamia Pinnata Seeds." International Journal of Emerging Technology and Advance Engineering, 4:3 2014.

JSW brochure, Twin Screw Extruder, 2014.

Lawal et al. "Mechanisms of Mixing in Single and Co-Rotating Twin Screw Extruders." Polymer Engineering and Science, 35:17 1995.

MLA Report, Evaluation and development of high moisture extruded red meat trim products, 2011.

Schneider. "Conical and Counter-Rotating: The Length Makes the Difference." Kunststoffe international 2012.

International Search Report and Written Opinion dated Jun. 1, 2018, in PCT/US2018/018398 filed Feb. 15, 2018.

\* cited by examiner

MEAT DEWATERING ASSEMBLY

CROSS-REFERENCE TO RELATED APPLICATION

This application claims the benefit of U.S. Provisional Application Ser. No. 62/459,689, filed Feb. 16, 2017, which is incorporated herein by reference in its entirety.

BACKGROUND OF THE INVENTION

Field of the Invention

The present invention is broadly concerned with improved apparatus for dewatering of various meat products, to enable use thereof in high quantities as a part of pet feed recipes. More particularly, the invention is concerned with such apparatus which makes use of a pair of tapered, converging, intermeshed, counter-rotating helical screws located within an apertured housing. Rotation of the screws serves to express water from meat, providing a relatively dry product for use in extrudable pet feed mixtures.

Description of the Prior Art

Traditionally, kibble-type pet feeds have been produced using extrusion equipment. This normally involves use of a preconditioner which serves to initially moisten and partially cook the feed mixture, including grains, starches, fats, and other minor ingredients. After preconditioning, the mixture is fed into an extruder where it is fully cooked and shaped by a finished product ready for drying and packaging.

In recent years, pet feed producers have sought to incorporate greater and greater quantities of fresh meat into the feed recipes. At relatively low levels of meat addition, the traditional extrusion processing technologies are suitable. However, when attempts are made to incorporate high levels of meat (e.g., greater than about 40% by weight), standard preconditioner/extruder equipment may not be adequate. One issue is that fresh meat products are very high in moisture, and thus the usual steps of moisture addition into the preconditioner and/or extruder renders the product too wet for successful extrusion.

In response to this problem, equipment manufacturers have designed specialized extrusion equipment to handle high-moisture feed recipes. Another alternative, however, is to dewater the meat before it is mixed with the other feed ingredients, thereby at least partially ameliorating the high-moisture problem. However, prior dewatering devices have not been capable of efficiently dewatering meat to a low enough level for effective use in pet feed recipes.

References of interest include the following: U.S. Pat. Nos. 2,567,219, 4,438,691, 4,565,124, 4,935,183, 5,232,280, 5,333,556, 5,628,560, 5,694,883, 6,234,661, 6,609,819, 6,688217, 6,805,480, 7,191,700, 7,322,738,7,632,006, 7,731,879, 8,079,747, 8,596,856, and 9,316,439; US Patent Publications Nos. 2005/0219943 and 2008/0069916; Foreign Patent References Nos. CN101103825A, CN101531054A1, CN102225317A1, CN102275285A1, CN102490340A1, CN201439223U1, CN202062635U1, DE10113949A1, EP0358837, and WO2004080704; and non-patent publications: Baldwin, *Adding flexibility to the extrusion process*, Animal Feed, 2007; Bharath, *Design of Twin Screw Oil Expeller for Pongamia Pinnata Seeds*, International Journal of Emerging Technology and Advance Engineering, 2014; MLA Report, *Evaluation and development of high moisture extruded red meat trim products*, 2011; and JSW brochure, Twin Screw Extruder, 2014.

SUMMARY OF THE INVENTION

The present invention overcomes the problems outlined above, and provides improved apparatus and methods for dewatering meat, and particularly aqueous meat slurries. Broadly speaking, the invention provides dewatering assemblies comprising a pair of elongated, non-parallel, tapered and intermeshed helically flighted screws, each screw presenting a longitudinal axis, with the screws being oriented with the included angle between the longitudinal axes thereof being from about 1-7°, more preferably from about 1-5°, and most preferably about 2°. The helical fighting of the screws cooperatively presents nip clearances along the length of the screws. A housing is provided in at least partial surrounding relationship with the helical screws, the housing having an entrance opening for a emulsified meat (typically having meat particles no larger than about 3.0 mm), a series of water outlets along at least a part of the length of the housing, and a dewatered meat outlet. A drive is operably coupled with the screws in order to counter-rotate the screws during operation of the dewatering assembly.

The helically flighted screws are oriented to remove water from the emulsified meat by pressing meat particles within the nip clearances, and the housing is open to the atmosphere so that the pressure within the housing is substantially atmospheric (i.e., plus or minus 3% from true atmospheric pressure). In preferred forms, apparatus is provided to allow adjustment of the nip clearances between the flighting of the screws.

The invention also provides methods of dewatering meat-containing aqueous slurries comprising the steps of first passing an emulsified meat mixture into and through a meat dewatering assembly, the assembly comprising a pair of elongated, non-parallel, tapered and intermeshed helically flighted screws. Each of the screws presents a longitudinal axis, and the screws are oriented with the included angle between the longitudinal axes thereof being from about 1-7°, and with the helical fighting of the screws cooperatively presenting nip clearances along the length of the screws. The screws are counter-rotated during passage of the emulsified meat through the dewatering assembly in order to cause the meat particles within the mixture to be compressed within the nip clearances in order to expel water from the meat and allow recovery of dewatered meat. The entire process is carried out a substantially atmospheric pressure.

DETAILED DESCRIPTION OF THE PREFERRED EMBODIMENTS

The present invention overcomes the problems outlined above, and provides efficient, highly effective equipment for dewatering of meats of various types, including beef, pork, chicken, turkey, fish, and combinations thereof.

Turning first to FIGS. 1-4, a meat dewatering assembly 10 is depicted, which generally includes an elongated bottom support frame 12, a twin screw dewatering unit 14, a drive assembly 16 operably coupled with unit 14, an endmost, swingable screw support 18, and a water collection trough 20. As illustrated, the frame 12 supports all of the foregoing components in an in-line manner, from right to left, as viewed in FIGS. 1, 3, and 4.

In more detail, the support frame 12 has elongated, laterally spaced apart side members 22, 24, with intermediate connection structure 26 and spanning walls 27 extending between and interconnecting the side members. The drive assembly 16 includes an electric drive motor 28 having an output shaft 30 leading to gearbox 32. The gearbox 32 has a pair of output shaft assemblies 34, 36, each including a first adjustment collar 38, a first interconnected U-joint 40, a short output shaft 42 from the first U-joint 40 to a second U-joint 44, and a second adjustable collar 46.

The dewatering unit 14 includes a pair of uniformly tapered, non-parallel, intermeshed, helically flighted screws 52 and 54 each having a central flighted region 55, rearwardly extending drive section 56 extending into and supported within bearing housing 50, and forwardly extending stub shafts 58. As illustrated, the drive section 56 extends through the bearing housing 50 and is secured to adjustable collar 46. In the illustrated embodiment, the center lines of the screws 52, 54 have an included angle of 2° therebetween; more broadly, this angle would be from about 1-7°, more preferably from about 1-5°. Greater included angles of 10° or more would tend to degrade the performance of the assembly 10 by creating unduly high nip pressure conditions at the nip regions between the screws. The regions 55 of the screws 52, 54 are of single flight design, with a uniformly decreasing pitch length from rear to front, and a uniformly varying flight depth from rear to front. The screw 52 is a left-hand lead, variable lead (from 3.937 in. at the rear end to 2.520 in. at the forward end), variable depth screw, whereas the screw 54 is a right-hand lead, variable pitch, variable depth screw having the same lead dimensions. Pinch points or nip clearances 59 are provided between the intermeshed flights along the length of the screws, which are adjustable in length. Importantly, the screws are designed and powered to rotate in a counter-rotating fashion, i.e., they rotate in opposite clock directions.

The nip clearances 59 between the intermeshed flighting of the screws 52, 54 (see FIG. 7) can be varied using the adjustment structure described below between 0 and 0.161 inches at the large diameter ends of the screws, and from 0 to 0.086 inches at the small diameter ends of the screws. In alternate designs, multiple helix screws may be used in lieu of the screws 52, 54, or the screws could be of constant lead or constant pitch.

Figure 1:
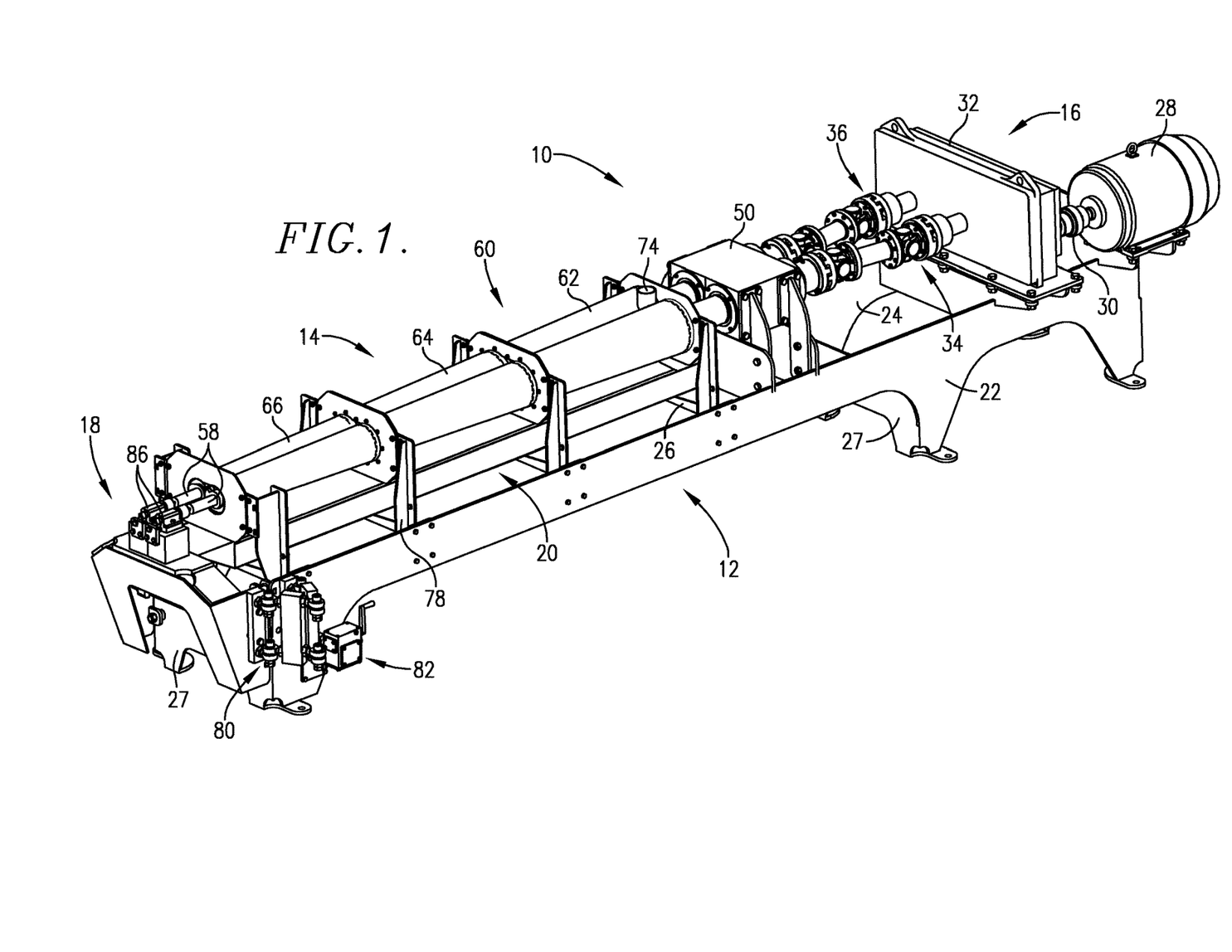
FIG. 1 is a perspective view of a meat dewatering assembly in accordance with the invention.
Figure 2:
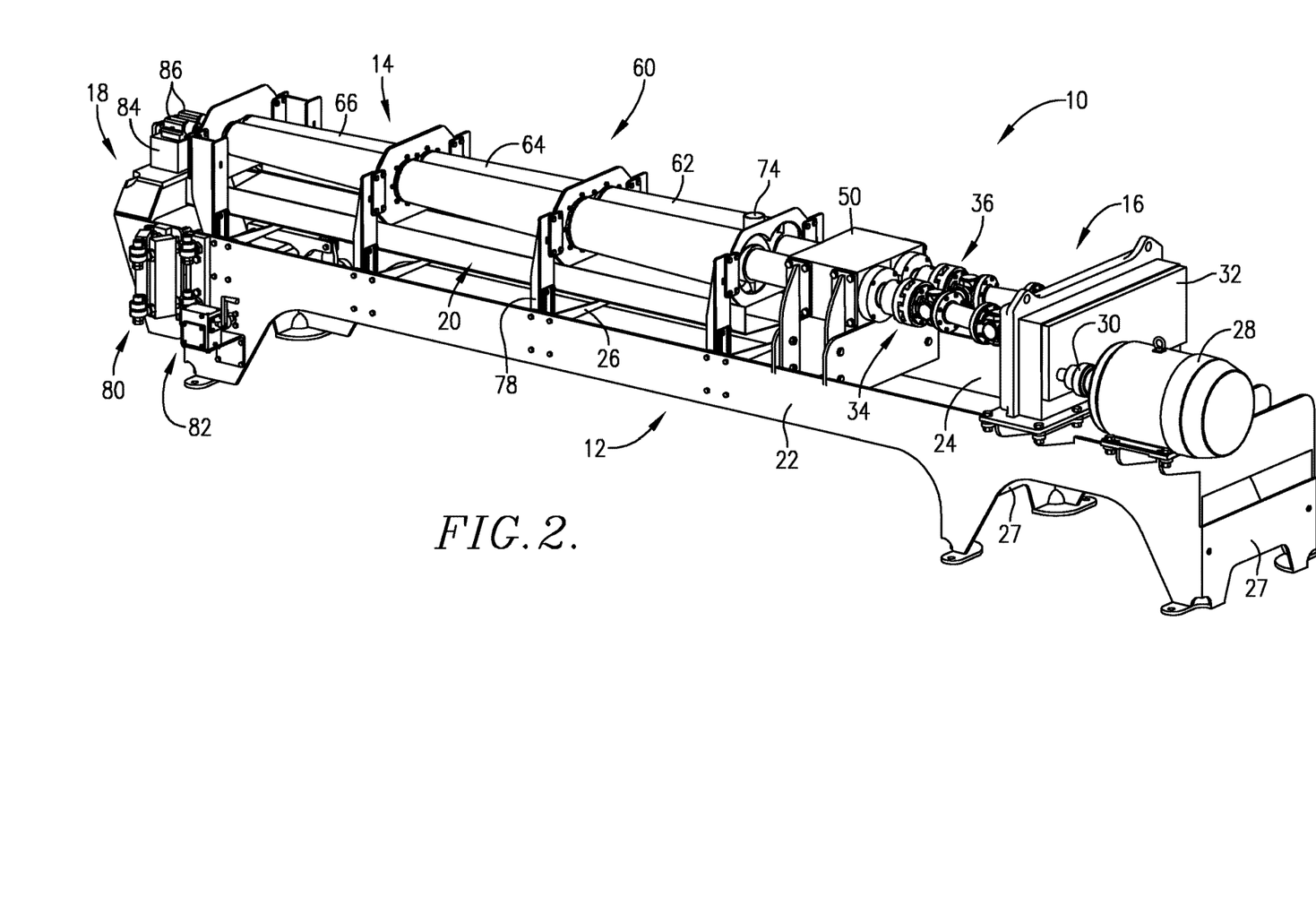
FIG. 2 is another perspective view of the meat dewatering assembly, from a different viewing angle.
Figure 3:
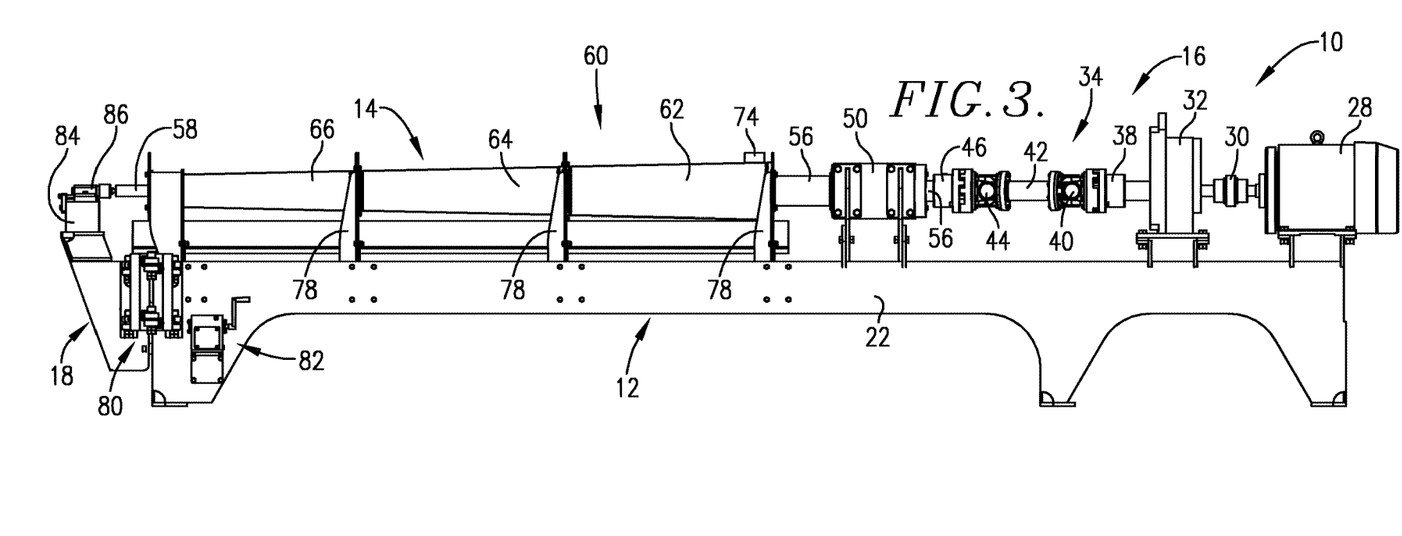
FIG. 3 is a side elevational view of the meat dewatering assembly.
Figure 4:
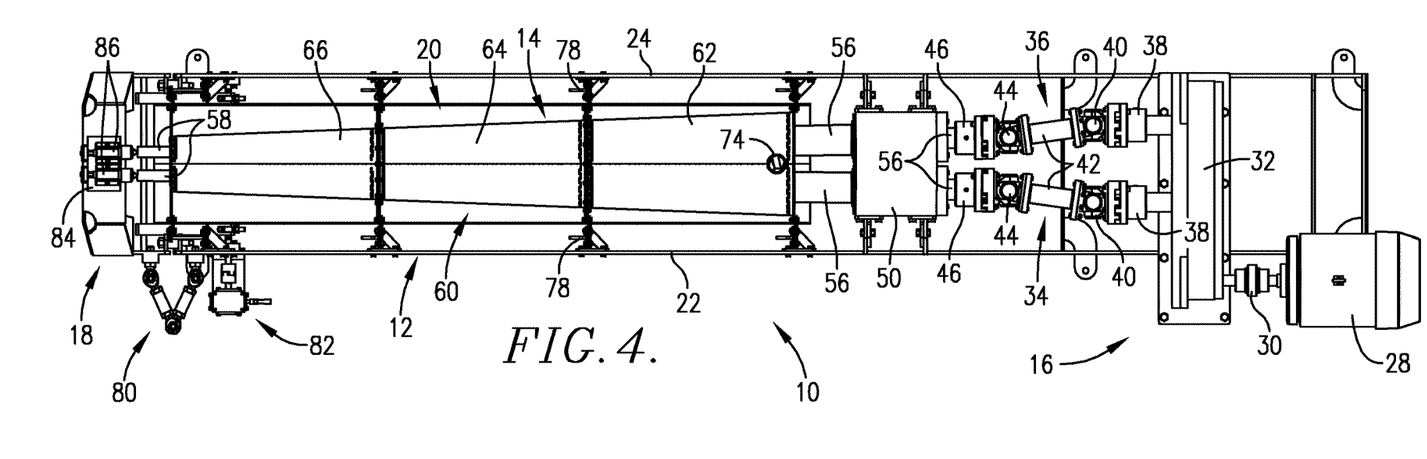
FIG. 4 is a plan view of the meat dewatering assembly.
Figure 6:
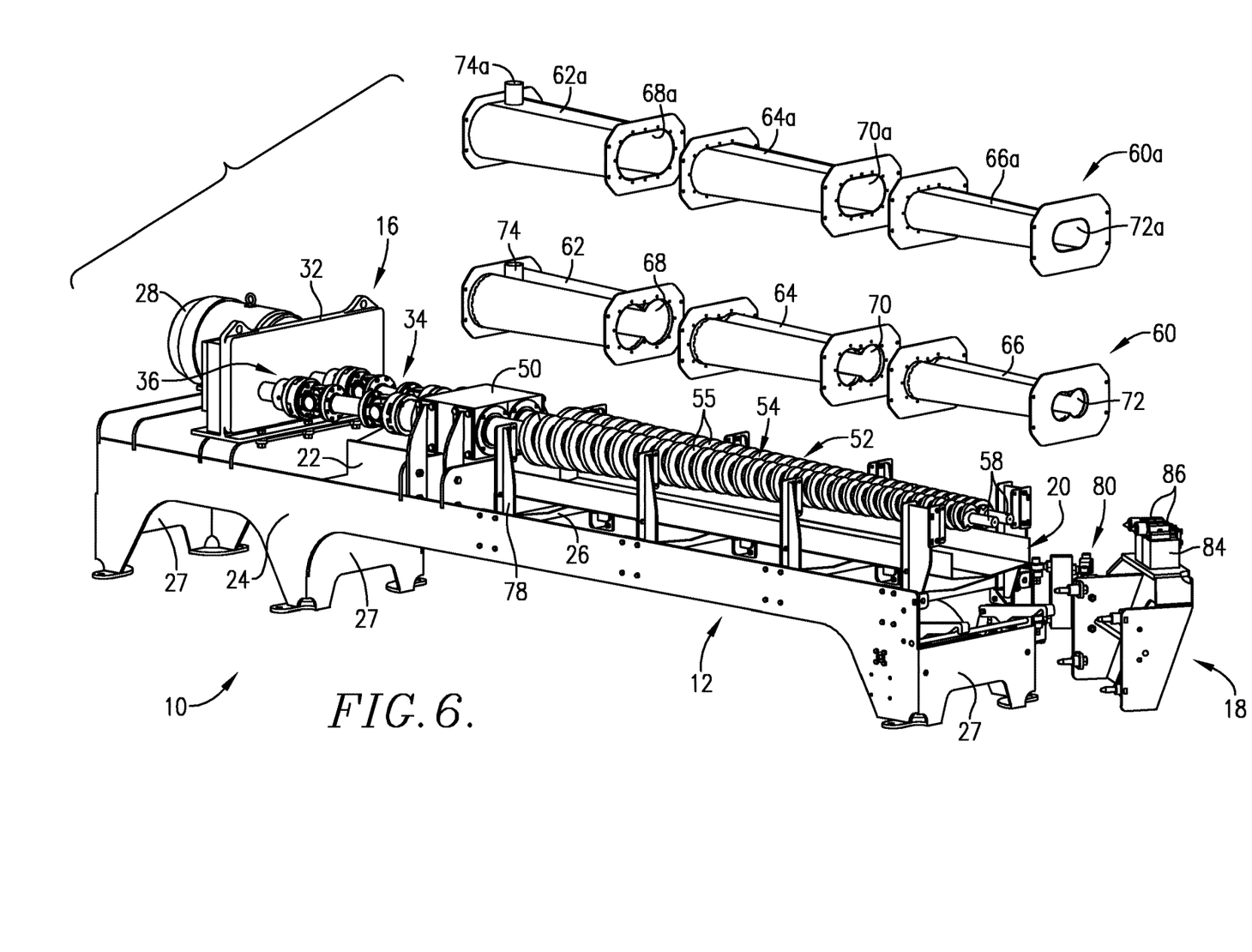
FIG. 6 is a perspective exploded view of the meat dewatering assembly, illustrating alternate housing assemblies and the endmost screw support frame in its open position.
Figure 11:
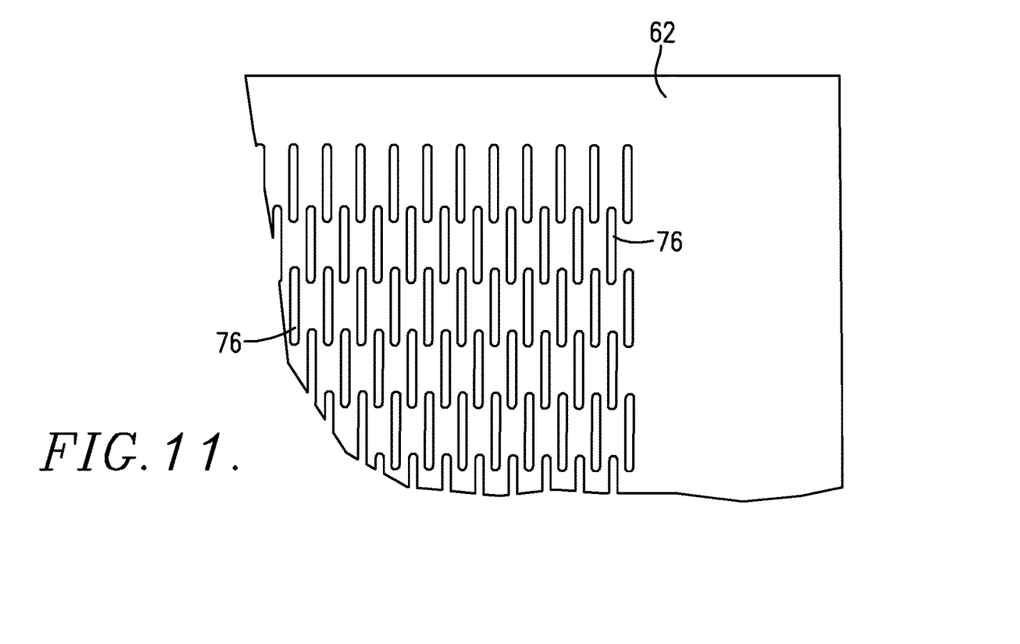
FIG. 11 is a fragmentary view illustrating the water expression slots in the housing of the meat dewatering assembly.

The overall unit 14 also includes a perforated, open-ended housing assembly 60, which receives the screws 52, 54, with the drive section 56 extending rearwardly from the housing, and the stub shafts 58 extending forwardly therefrom. As best seen in FIG. 6, the housing assembly 60 is made up of three end-to-end interconnected and tapered sections 62, 64, 66, with each having an internal bore 68, 70, 72 of somewhat "figure-8" configuration so as to closely surround the intercalated screws 52, 54, i.e., the housing presents two elongated, side-by-side, communicating chambers, each surrounding and receiving a corresponding screw 52 or 54. The rearmost housing section 62 is equipped with a tubular meat inlet 74. The sections 62-66 have a series of elongated, water drainage slots 76 formed therein. In this embodiment, the slots 76 in section 62 are 1 mm in width and 9 mm in length; the slots 76 in the downstream sections 64 and 66 are smaller, with the slots of section 64 greater than those of section 66. Also, in the embodiments of FIGS. 1-12, the slots 76 are provided about the entirety of the housing 60 and along the full length thereof. As best seen in FIGS. 1 and 3, a series of upright mounts 78 are secured to the side members 22, 24, and extend upwardly for connection to the housing sections, thereby suspending the housing 60 above the support frame 12. The open housing design insures that the meat dewatering operation of the assembly 10 occurs at substantially atmospheric pressures in contrast to typical extruders which normally operate at superatmospheric pressures.

As depicted in FIG. 6, use may be made of an alternate housing assembly 60a, which is identical to the assembly 60 except that the bores 68a, 70a, and 72a have essentially flat intermediate sections and rounded ends. Consequently, the walls of the housing sections 62a, 64a, and 66a do not closely conform to the configuration of the screws 52, 54 at the intermeshed regions thereof.

Figure 12:
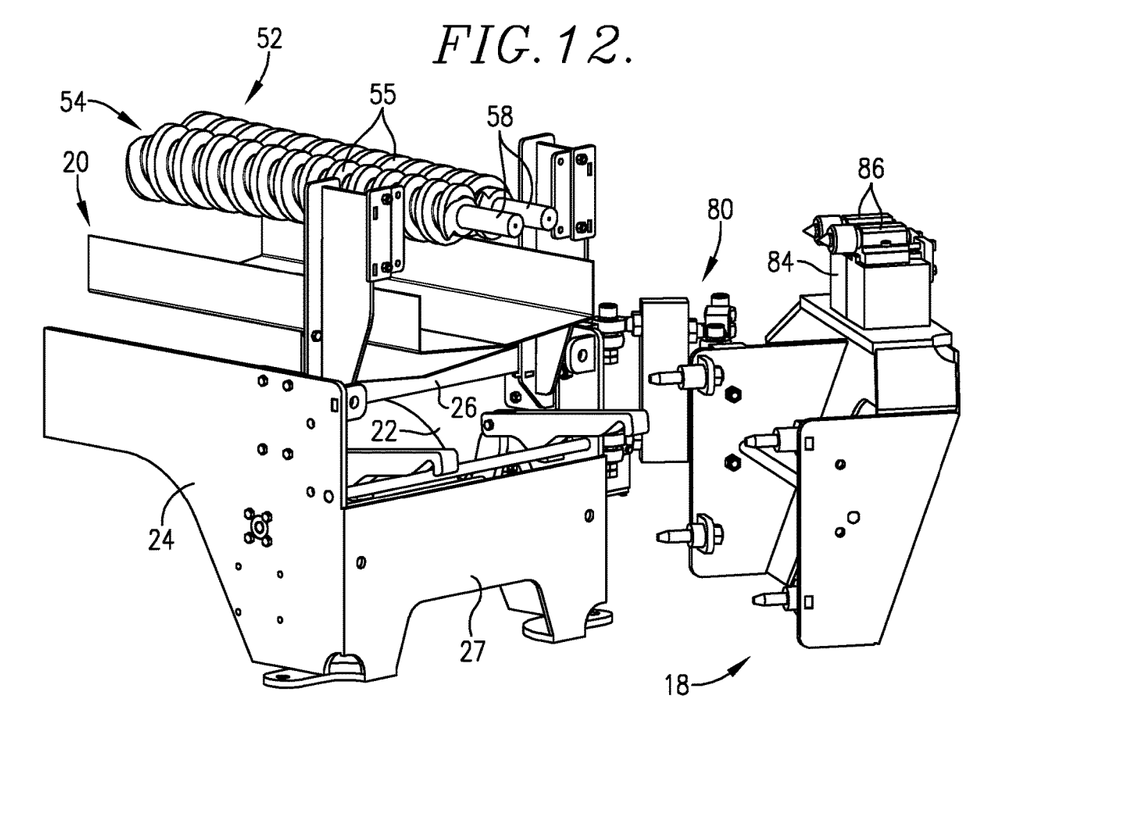
FIG. 12 is an enlarged view similar to that of FIG. 6, but illustrating in detail the swing frame screw support of the meat dewatering assembly.

The swingable screw support 18 is mounted to the forward end of support frame 12 by means of a pivot assembly 80, allowing the support 18 to be selectively moved from a closed position, illustrated in FIGS. 1-5, to an open position, illustrated in FIG. 6. Appropriate latching structure (see FIGS. 6 and 12) is provided to hold the support 18 in its closed position, with an attach/detach crank 82. When it is desired to open the support, the crank 82 is actuated, and the support is swung outwardly to the FIG. 6 position. The support 18 is provided with a fixture 84 having a pair of side-by-side bearing supports 86, which receive the forwardly projecting stub shafts 58 of the screw 52, 54; thus, the screws are supported at both ends thereof during operation of the assembly 10.

The water collection trough 20 positioned under housing 60 is of generally U-shaped configuration and is designed to receive water expressed through the housing slots 76. Suitable water take-away structure (not shown) is provided for draining of the trough 20 during operation of the assembly 10.

Figures 5, 7, 8, 9, 10:
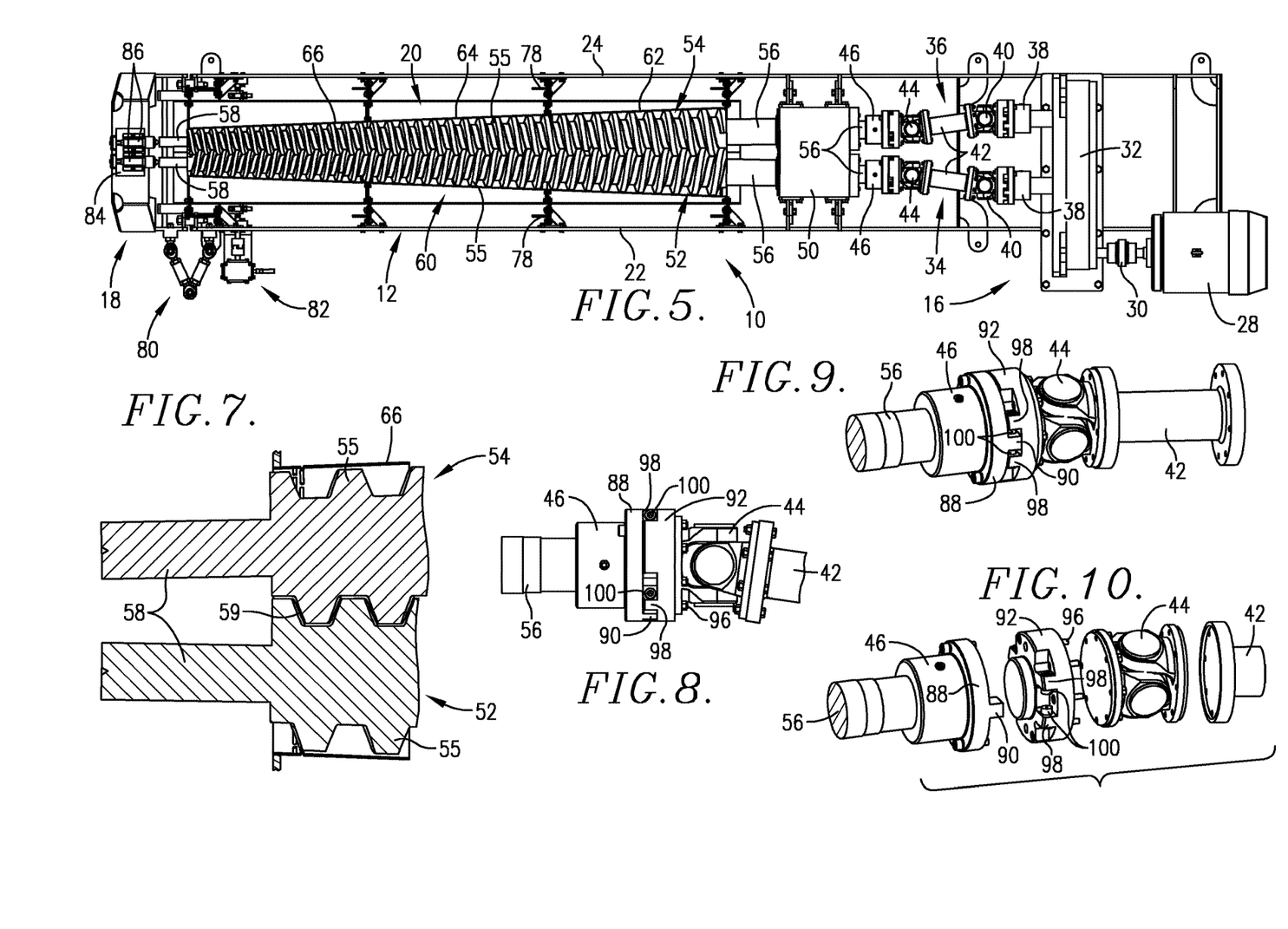
FIG. 5 is a top view of the meat dewatering assembly, with the screw housing removed to illustrate the configuration of the dual dewatering screws.
FIG. 7 is a sectional view illustrating the forward ends of the intermeshed screws of the meat dewatering assembly, illustrating the nip clearances between the flightings of the screws.
FIG. 8 is an enlarged top view illustrating one of the U-joint/adjustment collars forming a part of the meat dewatering assembly.
FIG. 9 is a perspective view of one of the U-joint/adjustment collars forming a part of the meat dewatering assembly.
FIG. 10 is an exploded view of one of the U-joint/adjustment collars forming a part of the meat dewatering assembly.

As indicated previously, the nip clearances between the screws 52, 54 can be varied. In order to do this, use is made of one or more of the adjustment collars 38. Referring to FIGS. 8-10, the adjustment collar/U-joint 46/44 is illustrated. Specifically, the rearmost end of drive section 56 of screw 54 is secured to the collar 46. The collar 46 has a first radially expanded segment 88 having a pair of opposed lugs 90. The collar 46 also has a second segment 92 having a pair of opposed lug-receiving recesses 94. The segment 92 is secured to U-joint 44 by means of screws 96. The recesses 94 are defined by a pair of projections 98, each carrying an adjustment screw 100; the screws 100 engage the lugs 90 as shown. When it is desired to change the relative position of the screw 54 relative to the screw 52, and thereby change the nip clearances therebetween, it is only necessary to turn one of the adjustment screws 100, which affects a slight rotation of the collar 46, and thereby the entirety of the screw 54. Of course, such adjustments can only be made when the assembly 10 is not in operation.

Figures 13, 14:
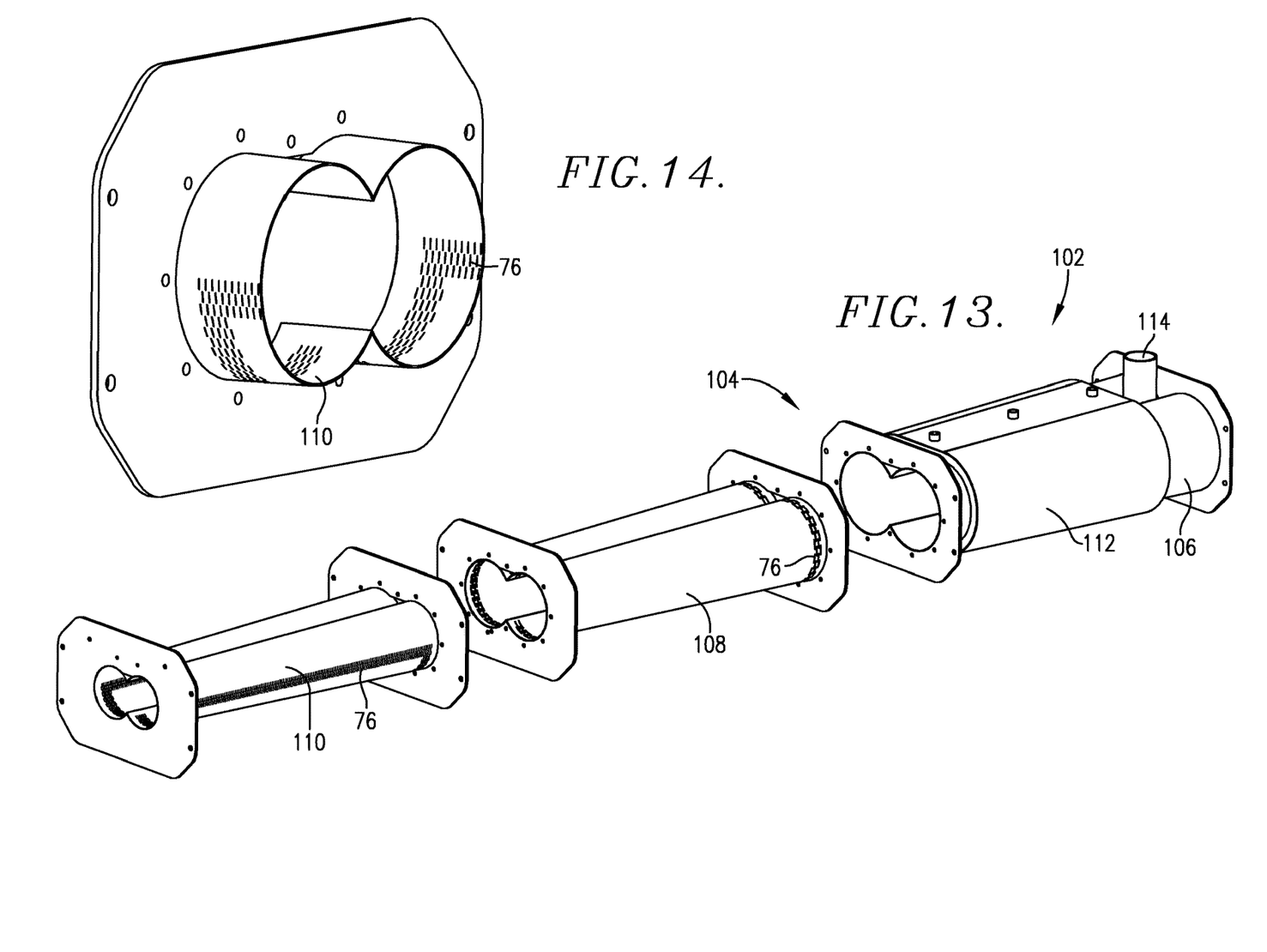
FIG. 13 is an exploded view of a modified housing employed in another embodiment of the invention and equipped with a first-section steam heater.
FIG. 14 is a fragmentary perspective view of the third housing section of the embodiment of FIG. 13, illustrating the pattern of drainage slots only on the bottom 180° of the housing section.

FIG. 13 illustrates a modified embodiment in the form of a meat dewatering assembly 102. In this embodiment, a screw assembly housing 104 is provided made up of first, second, and third end-to-end interconnected housing sections 106, 108, and 110. The initial housing section 106 is equipped with a surrounding steam-heating jacket 112, which serves to heat the emulsified meat introduced through the inlet 114. Moreover, in this embodiment, the intermediate housing section 108 is equipped with water-drainage slots 76, which cover the full surface area of the section 108. The final section 110 has slots 76 only on the bottom half thereof, as best seen in FIG. 14.

It is desirable that meat to be processed in the assembly 10 be first mechanically conditioned into an emulsified form, which may be optionally preheated to a temperature of from about 40-80° C., before delivery to the inlet 74. The meat then passes along the length of the housing 60 during counter-rotation of the screws 52, 54, the latter powered by means of drive assembly 16. As the meat traverses the length of the housing at substantially atmospheric pressures, the intermeshed screws serve to press or squeeze the meat particles within the emulsified meat, to thereby expel water through the housing slots 76 for collection within and take-away from trough 20. The fully dewatered meat then passes through the open forward end of the housing 60 where it is collected, by a suitable conveyor or other apparatus (not shown) separately from the expressed water. In normal practice, the screws 52, 54 are counter-rotated at a speed of from about 30-200 rpm, more preferably 50-150 rpm, which differs from typical twin-screw extruders equipped with high rotational speed, co-rotating screws.

We claim:

1. A meat dewatering assembly, comprising:
a pair of elongated, non-parallel, tapered and intermeshed helically flighted screws, each screw presenting a longitudinal axis, said screws oriented with the included angle between the longitudinal axes thereof being from about 1-7°, the helical fighting of the screws cooperatively presenting nip clearances along the length of the screws;
an elongated housing at least partially surrounding said helical screws with an entrance opening for emulsified meat, a series of water outlets along at least a part of the length of the housing, and a dewatered meat outlet,
the rear end of said screws located adjacent said housing entrance, and the front end of said screws located adjacent said dewatered meat outlet, the pitch length of the helical fighting of said screws decreasing along the length of the screws between said rear and front ends;
a drive operably coupled with said screws in order to counter-rotate the screws during operation of the dewatering assembly; and
said housing configured so that as meat traverses the length of the housing the pressure within the housing is substantially atmospheric.

2. The assembly of claim 1, said housing presenting a pair of side-by-side chambers respectively receiving a corresponding helical screw.

3. The assembly of claim 1, said screws oriented to remove water from said emulsified meat by pressing meat particles therein within said nip clearances.

4. The assembly of claim 1, said angle being about 2°.

5. The assembly of claim 1, said water outlet comprising a series of perforations formed in said housing.

6. The assembly of claim 5, said perforations extending entirely around the full surface area of said housing.

7. The assembly of claim 5, said perforations being present only along the bottom portion of said housing.

8. The assembly of claim 1, including a water trough below said housing.

9. The assembly of claim 1, said housing being tapered along the length thereof.

10. The assembly of claim 1, including apparatus operable to adjust the nip clearances between the flightings of said screws.

11. The assembly of claim 1, the pitch length of the helical fighting of said screws uniformly decreasing along the length of the screws between said rear and front ends.

12. The assembly of claim 1, said drive operable to counter-rotate said screws at a speed of from about 50-150 rpm.

13. The assembly of claim 1, said water outlets adjacent said housing inlet being larger than the water outlets adjacent said dewatered meat outlet.

14. The assembly of claim 1, the flight depths of said flightings uniformly varying from the rear of said screws to the front of said screws.

* * * * *